(12) United States Patent
Shuto (10) Patent No.: US 10,015,335 B2
(45) Date of Patent: Jul. 3, 2018

(54) MEDIUM TRANSPORT DEVICE AND IMAGE READING APPARATUS

(71) Applicant: SEIKO EPSON CORPORATION, Tokyo (JP)

(72) Inventor: Ryoichi Shuto, Kitakyushu (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 15/339,032

(22) Filed: Oct. 31, 2016

(65) Prior Publication Data

US 2017/0126912 A1 May 4, 2017

(30) Foreign Application Priority Data

Nov. 2, 2015 (JP) ................................. 2015-215751

(51) Int. Cl.
| | |
|---|---|
| *H04N 1/04* | (2006.01) |
| *H04N 1/00* | (2006.01) |
| *B65H 3/06* | (2006.01) |
| *B65H 3/34* | (2006.01) |
| *B65H 7/02* | (2006.01) |

(52) U.S. Cl.
CPC ......... *H04N 1/00588* (2013.01); *B65H 3/063* (2013.01); *B65H 3/34* (2013.01); *B65H 7/02* (2013.01); *H04N 1/00618* (2013.01); *B65H 2801/39* (2013.01); *H04N 2201/0081* (2013.01)

(58) Field of Classification Search
None
See application file for complete search history.

(56) References Cited

U.S. PATENT DOCUMENTS

| | | | | |
|---|---|---|---|---|
| 6,128,463 | A * | 10/2000 | Matsumoto | G03G 15/231 399/364 |
| 6,233,068 | B1 * | 5/2001 | Kondo | H04N 1/2307 358/412 |
| 8,152,163 | B2 * | 4/2012 | Kitan | B65H 29/70 271/207 |
| 8,953,194 | B2 * | 2/2015 | Yamamura | H04N 1/00005 358/1.1 |
| 9,670,015 | B2 * | 6/2017 | Hara | B65H 1/266 |
| 2007/0009275 | A1 * | 1/2007 | Yokoyama | B41J 3/28 399/69 |
| 2009/0035042 | A1 * | 2/2009 | Lee | G03G 15/2064 400/70 |
| 2014/0203494 | A1 | 7/2014 | Okumura et al. | |
| 2015/0284200 | A1 * | 10/2015 | Hyodo | B65H 7/02 271/3.2 |

FOREIGN PATENT DOCUMENTS

JP          2014-136644 A          7/2014

* cited by examiner

*Primary Examiner* — Cheukfan Lee
(74) *Attorney, Agent, or Firm* — Workman Nydegger (57) ABSTRACT

A medium transport device includes a feeding roller which sends a medium to a downstream side; and a detecting unit which can detect the medium sent by the feeding roller at a predetermined position on a transport path, in which the detecting unit includes a lever member of which a posture is changed when being in contact with the medium, and a detecting portion which detects a change in posture of the lever member, and the lever member applies an external force which causes at least a part of the medium to be bent in a gravity direction by being in contact with the medium in a predetermined posture.

14 Claims, 9 Drawing Sheets

MEDIUM TRANSPORT DEVICE AND IMAGE READING APPARATUS

BACKGROUND

1. Technical Field

The present invention relates to a medium transport device which transports a medium, and an image reading apparatus which includes the medium transport device.

2. Related Art

In a medium transport device in the related art, a medium mounted on a mounting unit is transported to a downstream side in a transport direction by being held between a feeding roller and a separating unit. In addition, mediums of a various type of which sizes or materials are different are transported in the medium transport device. For this reason, there is a case in which a medium transported on a transport path of the medium is jammed (clogged), when a thin medium, or a medium with low rigidity is transported.

For this reason, in the medium transport device, various countermeasures are established so as to reduce an occurrence of jamming on the medium transport path. For example, as an example of the countermeasure, jamming of a medium on the transport path is reduced by strengthening (rigidity) the medium in a transporting state. As an example of a countermeasure for strengthening a medium, there is a medium transport device in which a medium is transported by being pressed in at least a part thereof in a direction intersecting a transport direction of the medium, and by being bent (refer to JP-A-2014-136644).

A movable strengthening unit which causes at least a part of medium to be bent by pressing thereof in a direction intersecting a transport direction of the medium, when a feeding roller transports the medium is provided in a medium transport device in JP-A-2014-136644. Specifically, the strengthening unit is provided in an arm-shaped member, the strengthening unit is pressed to the medium by rotating the arm-shaped member on the medium side along with transporting of the medium using the feeding roller, and the medium is bent. In this manner, the medium is strengthened, and it is possible to reduce jamming of the medium on the transport path.

Meanwhile, in such a medium transport device, a presence or absence of a medium which is transported is detected using a medium detecting unit, and a driving control of the feeding roller is performed based on the detected information. In addition, the arm-shaped member, the medium detecting unit, or the like, which is described above is provided along the medium transport path from the mounting unit to the feeding roller.

In addition, when these plurality of members are provided on the medium transport path from the mounting unit to the feeding roller, there is a concern that a defect which is caused when disposing areas interfere with each other may occur, or a concern that the medium transport path may become long, and as a result, the apparatus may become large, when disposing areas are disposed so as not to overlap.

SUMMARY

An advantage of some aspects of the invention is to provide a medium transport device in which jamming of a medium is reduced, and a device configuration can be simplified, and an image reading apparatus which is provided with the device.

According to a first aspect of the invention, there is provided a medium transport device which includes a feeding roller which sends a medium to a downstream side; and a detecting unit which can detect the medium sent by the feeding roller at a predetermined position on a transport path, in which the detecting unit includes a lever member of which a posture is changed when being in contact with the medium, and a detecting portion which detects a change in posture of the lever member, and the lever member applies an external force which causes at least a part of the medium to be bent in a gravity direction by being in contact with the medium in a predetermined posture.

According to the aspect, since the lever member applies an external force which causes at least a part of the medium to be bent in the gravity direction by being in contact with the medium, it is possible to increase rigidity when transporting the medium, and reduce jamming (clogging) of the medium on a medium transport path, by bending at least a part of the medium. In addition, since the lever member which detects passing through of the medium performs a function of improving rigidity by bending the medium, it is possible to reduce the number of components, and make a configuration of the device simple.

Here, "applying external force which causes bending to medium" does not mean that bending is essential for the medium as a result, and means that the medium is pressed in a direction of being bent.

In the medium transport device according to a second aspect of the invention, in postures of the lever member, a first posture of not being in contact with the medium, a second posture of detecting the medium by being in contact with the medium, and a third posture of applying an external force which causes at least a part of the medium to be bent in the gravity direction may be included, the lever member may include an urging unit which urges the lever member toward the first posture, and an urging force with which the urging unit urges the lever member, when the lever member assumes the third posture, may be larger than an urging force with which the urging unit urges the lever member when the lever member assumes the second posture.

According to the aspect, since the urging force of the urging unit in the third posture of the lever member is larger than the urging force in the second posture, it is possible to make a load applied to the medium small, in a case of detecting the medium in the lever member, and it is possible to make an external force large when applying the external force which can bend the medium. As a result, it is possible to make rigidity of the medium strong, and reliably reduce jamming of the medium, since it is possible to further reliably bend the medium at a time of transporting the medium.

In the medium transport device according to a third aspect, the lever member may assume a fourth posture as a posture in which the lever member retreats from the medium transport path, compared to the third posture according to rigidity of the medium.

According to the aspect, since the lever member may assume the fourth posture as a posture in which the lever member retreats from the medium transport path, compared to the third posture according to rigidity of the medium, it is possible to relieve a concern that a medium may be scratched, when transporting a medium which is barely bent even when being applied with an external force, for example, a medium with high rigidity.

The medium transport device according to a fourth aspect may include a separating unit which separates the medium by holding thereof between the separating unit and the feeding roller, and a medium support unit which is provided on an upstream side of the feeding roller and the separating unit, and supports the medium, in which the lever member may assume the first posture in a state in which the medium is not supported by the medium support unit, may be switched from the first posture to the second posture due to a tip end of the medium, when the medium is set on the medium support unit, and may be switched from the second posture to the third posture due to the medium, when the medium is sent out from the medium support unit due to a rotation of the feeding roller.

According to the aspect, it is possible to obtain the same operational effect as that in the above described second or third aspect.

In the medium transport device according to a fifth aspect of the invention, the lever member may change a posture when oscillating around an oscillating shaft, and the oscillating shaft may be located above a position at which the medium is in contact with the lever member.

According to the aspect, since the oscillating shaft of the lever member is located above the position at which the medium is in contact with the lever member, it is possible to cause the lever member to smoothly oscillate with a small resistance, when the medium causes the lever member to oscillate.

In the medium transport device according to a sixth aspect of the invention, the lever member may include an abutting portion which extends across the medium transport path from the oscillating shaft, and is in contact with a tip end of the medium which is set on the medium support unit, and a pressing portion which is provided on a tip end side of the lever member, compared to the abutting portion, and presses the medium when the lever member assumes the third posture.

According to the aspect, it is possible to obtain the same operational effect as that in any one of the above described second to fifth aspects.

In the medium transport device according to a seventh aspect of the invention, the abutting portion may be located on the upstream side of the separating unit in the transport direction on the medium transport path, when the lever member assumes the first posture and the second posture, and may be located on the downstream side of a position in which the separating unit and the medium are in contact, on the medium transport path, when the lever member assumes the third posture.

According to the aspect, since the abutting portion is located on the downstream side of the position in which the separating unit and the medium are in contact, on the medium transport path, when the lever member assumes the third posture, the abutting unit does not interrupt separating of the medium using the separating unit, at a time of transporting the medium, and it is possible to reliably separate the medium.

According to an eighth aspect of the invention, there is provided an image reading apparatus which includes the medium transport device in any one of the first to seventh aspects; and an image reading unit which can read the medium which is transported by the feeding roller.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, embodiments of the invention will be described based on drawings. The same configurations in each embodiment are given the same reference numerals, are described only in the first embodiment, and descriptions thereof will be omitted in embodiments thereafter.

Figure 1:
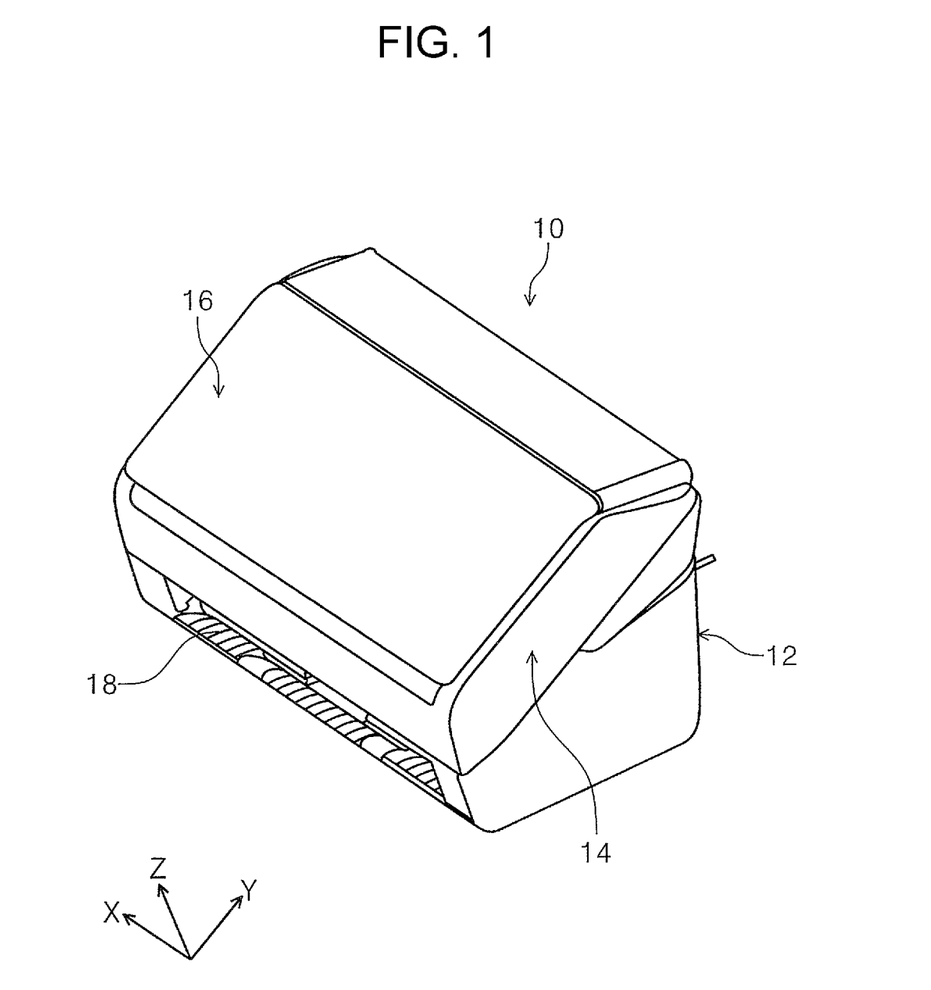
FIG. 1 is a perspective view which illustrates an appearance of an image reading apparatus according to the invention.
Figure 2:
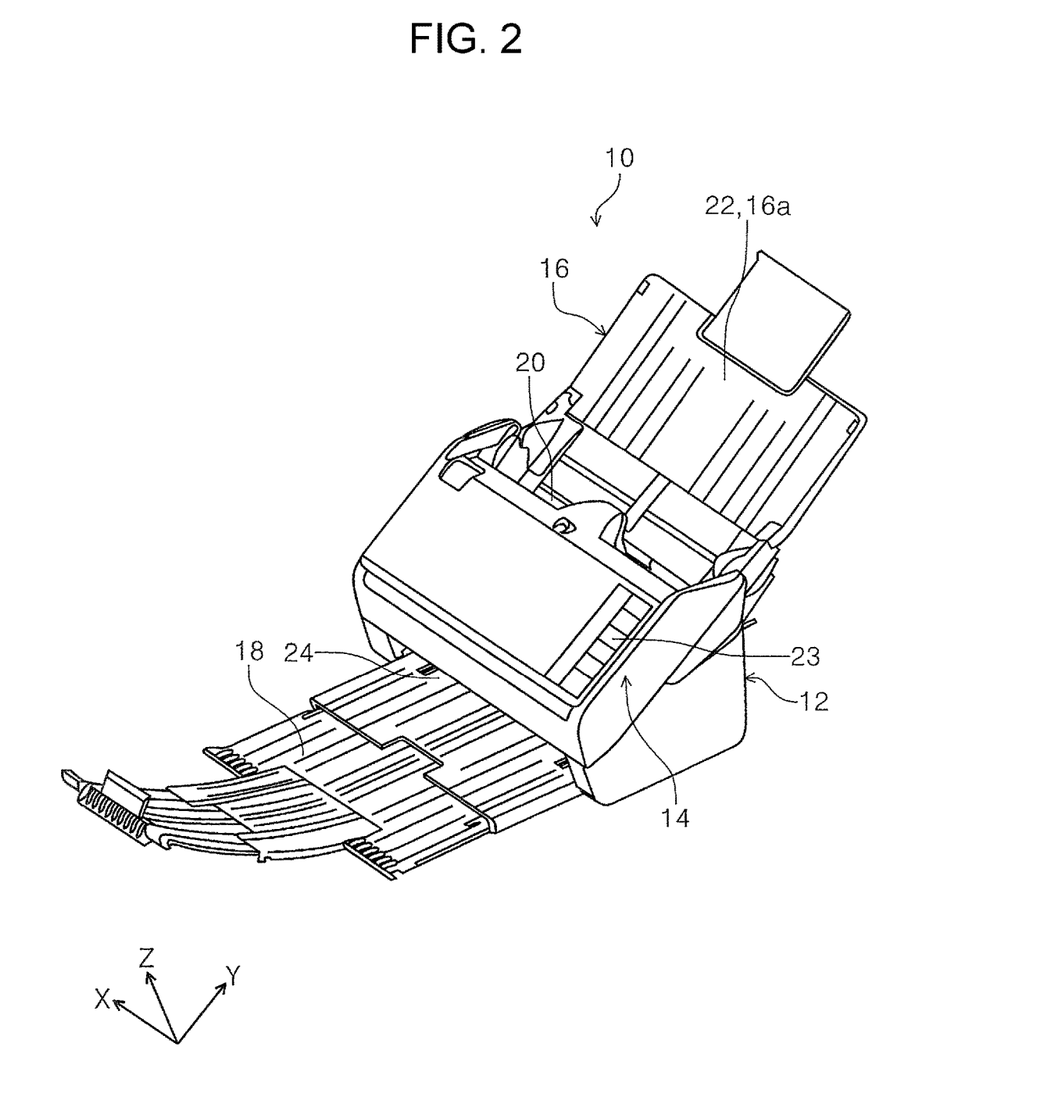
FIG. 2 is a perspective view which illustrates a state in which feeding can be performed in the image reading apparatus according to the invention.
Figure 3:
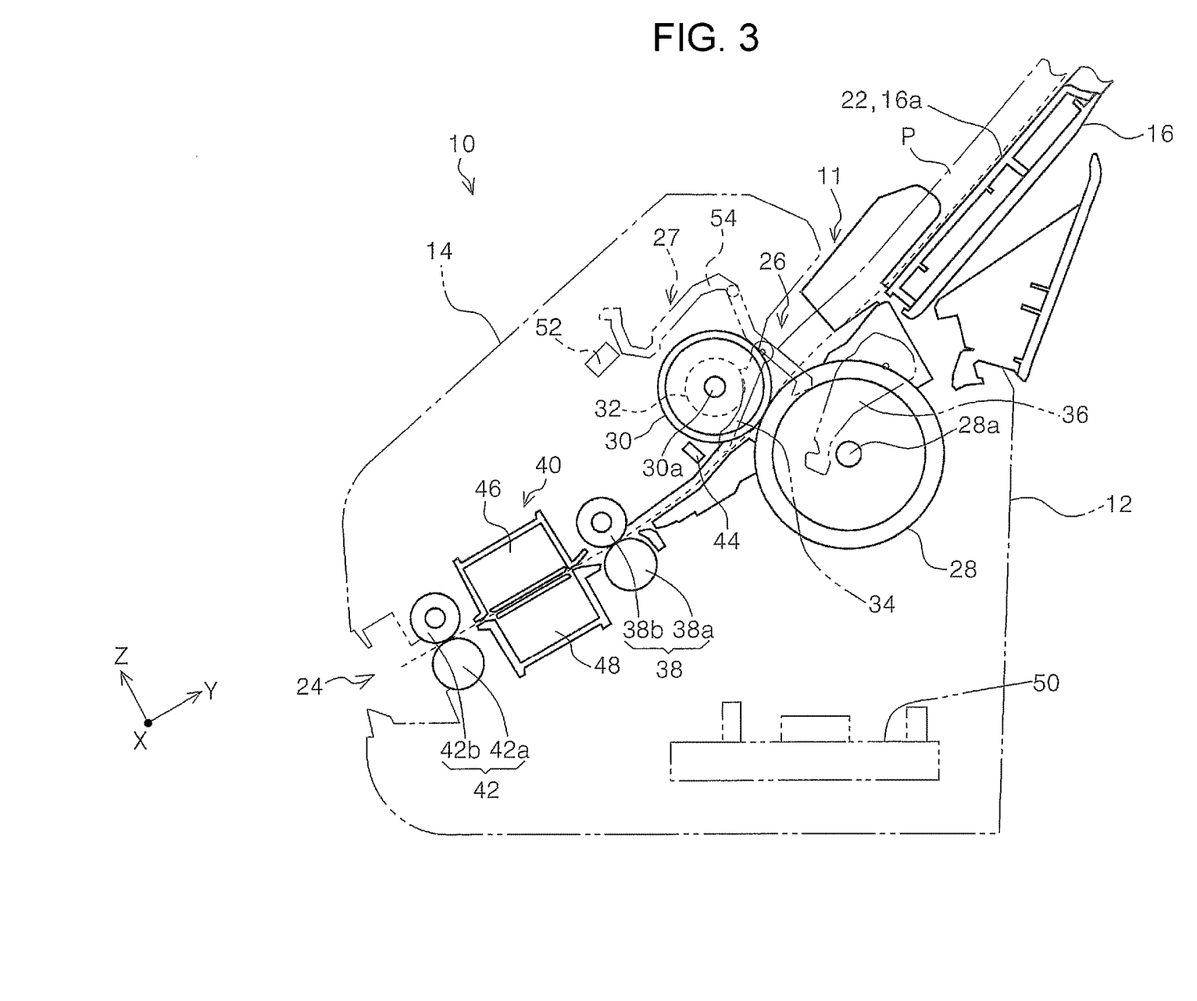
FIG. 3 is a side sectional view which illustrates a transport path in the image reading apparatus according to the invention.
Figure 4:
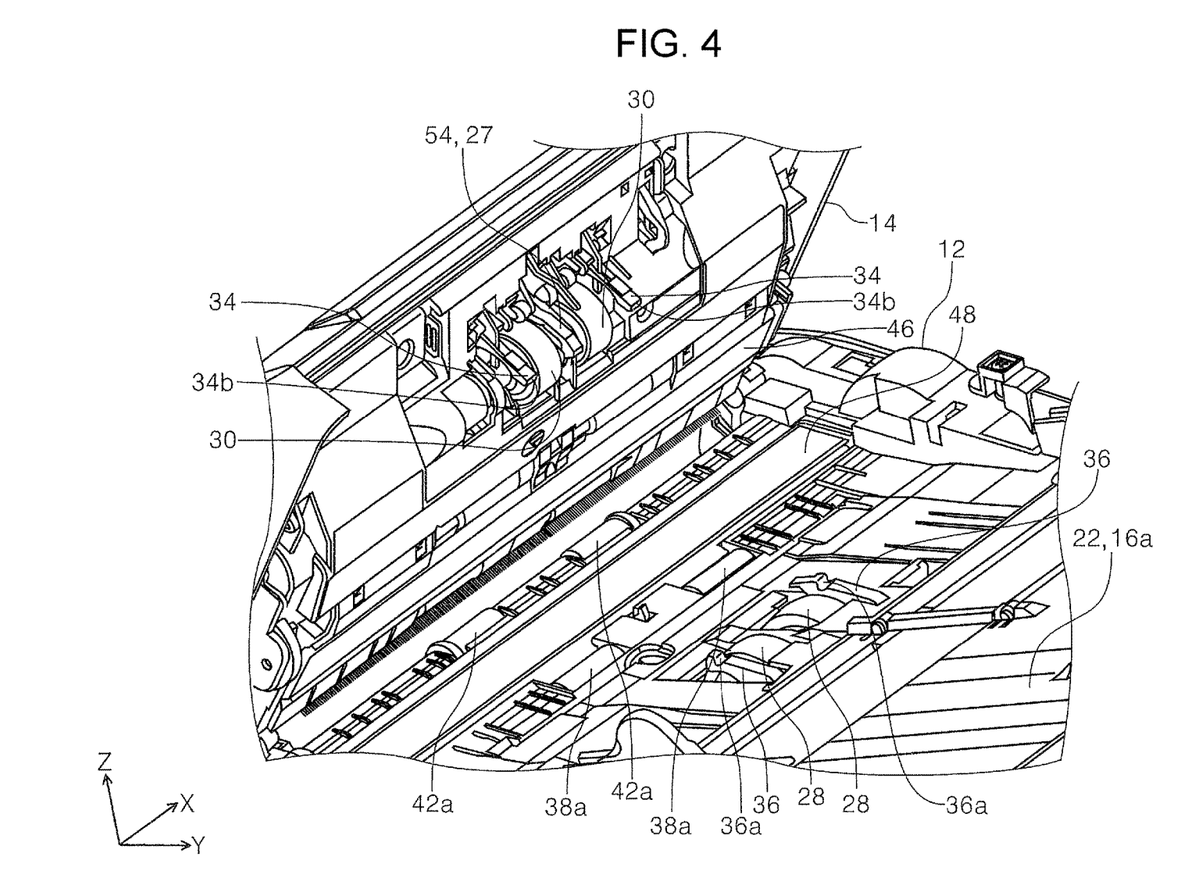
FIG. 4 is a perspective view which illustrates a separating roller and a detecting lever in a state in which an upper unit is open to a lower unit.

FIG. 1 is a perspective view which illustrates an appearance of an image reading device according to the invention, FIG. 2 is a perspective view which illustrates a state in which feeding can be performed in the image reading apparatus according to the invention, FIG. 3 is a side sectional view which illustrates a transport path in the image reading apparatus according to the invention, and FIG. 4 is a perspective view which illustrates a separating roller and a detecting lever in a state in which an upper unit is open to a lower unit.

Figure 5:
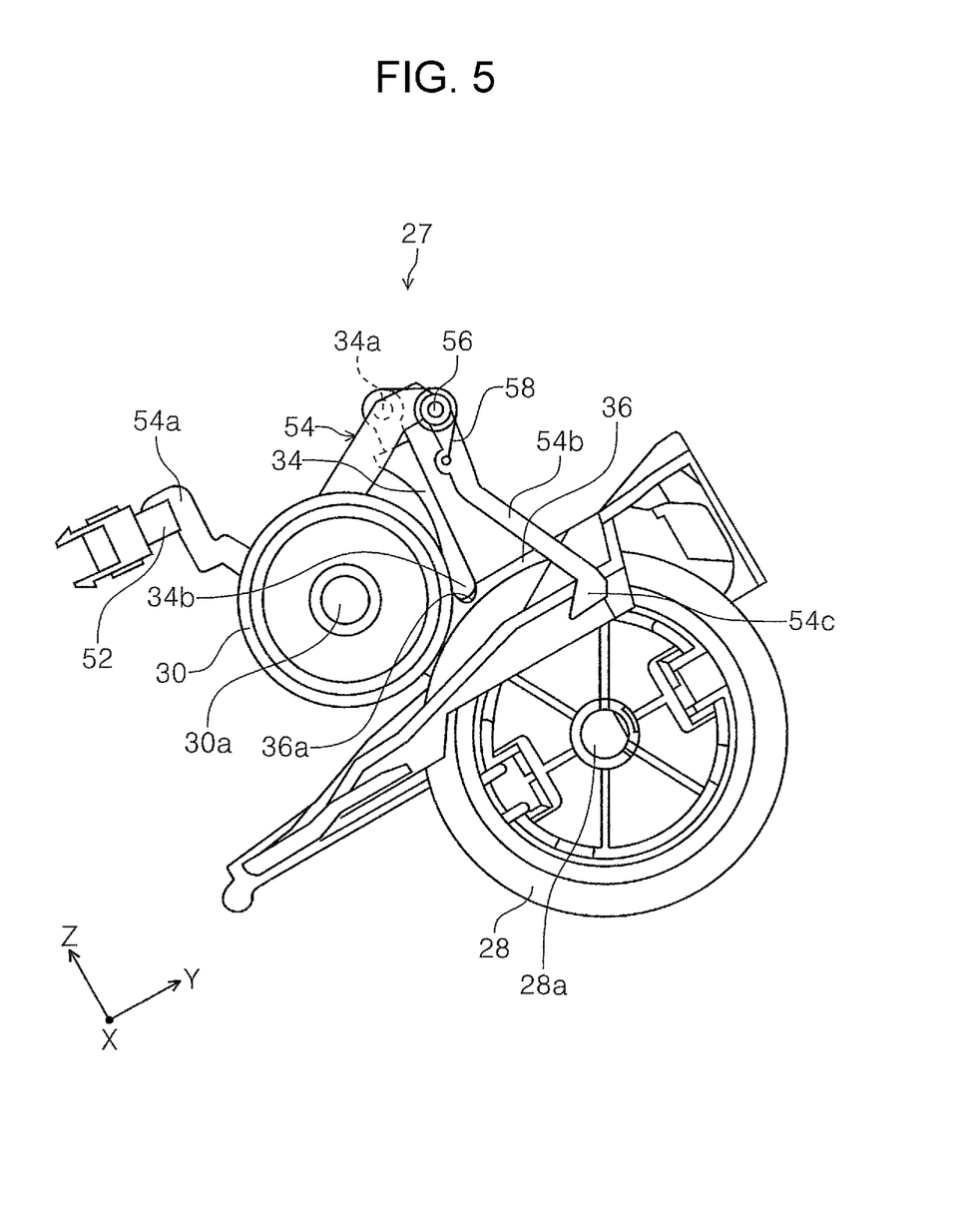
FIG. 5 is a side sectional view which illustrates a first posture of the detecting lever according to the invention.
Figure 6:
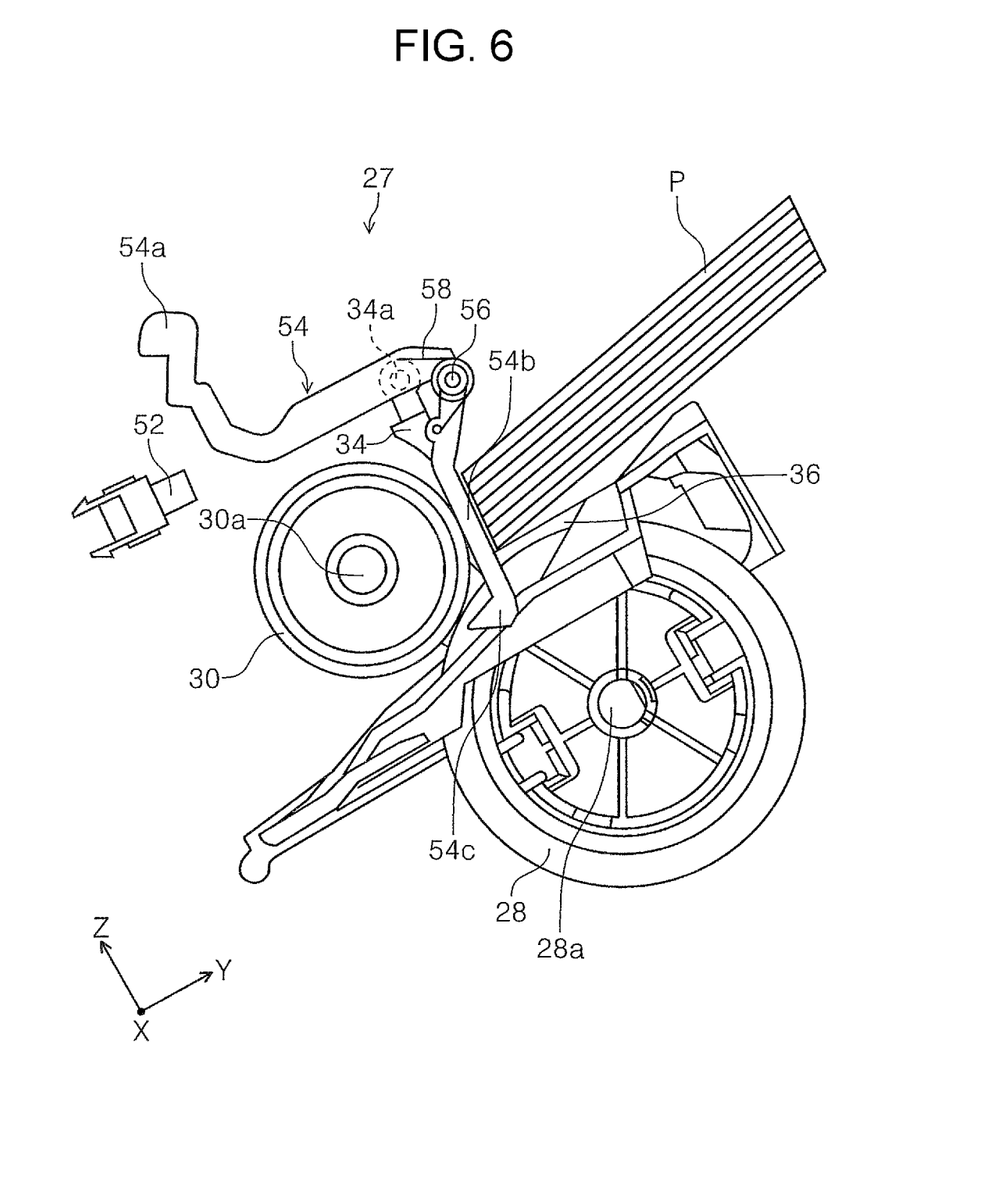
FIG. 6 is a side sectional view which illustrates a second posture of the detecting lever according to the invention.
Figure 7:
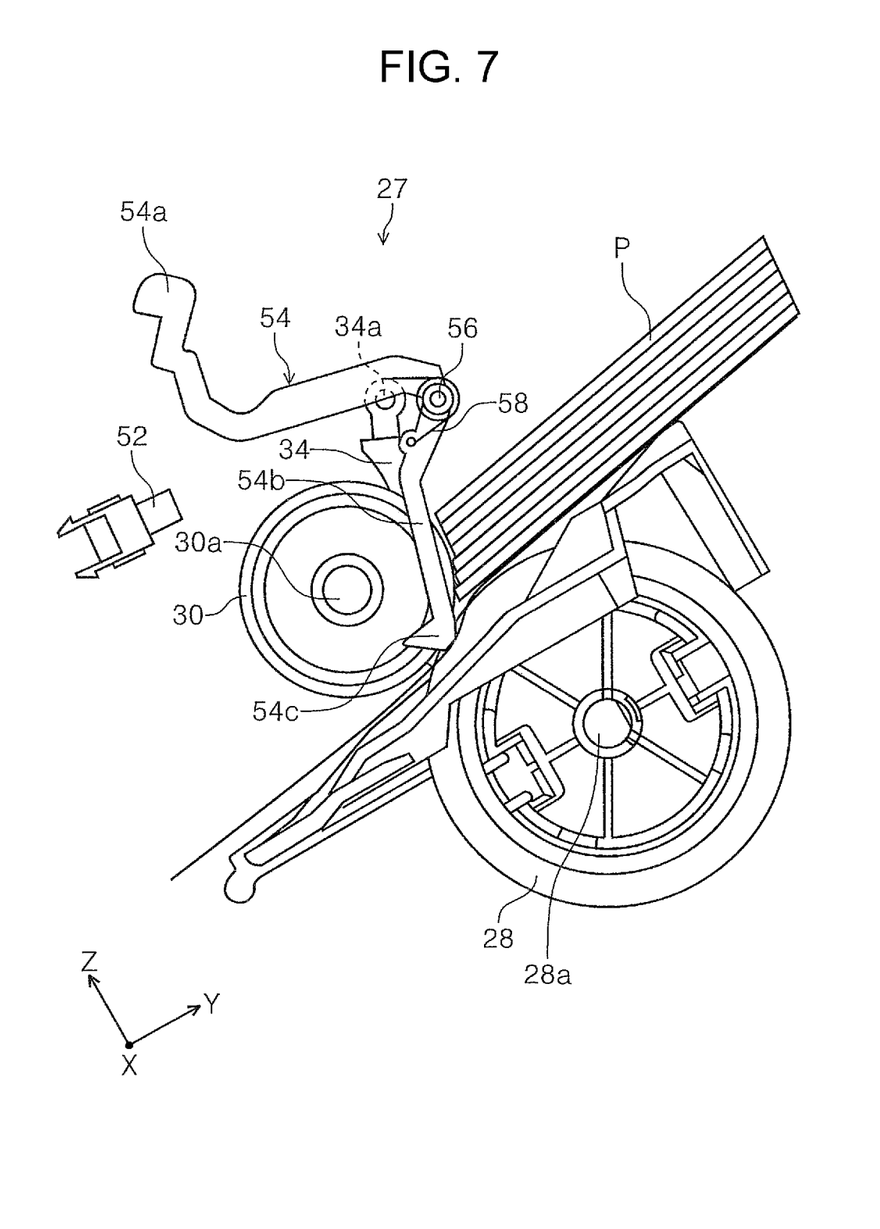
FIG. 7 is a side sectional view which illustrates a third posture of the detecting lever according to the invention.
Figure 8:
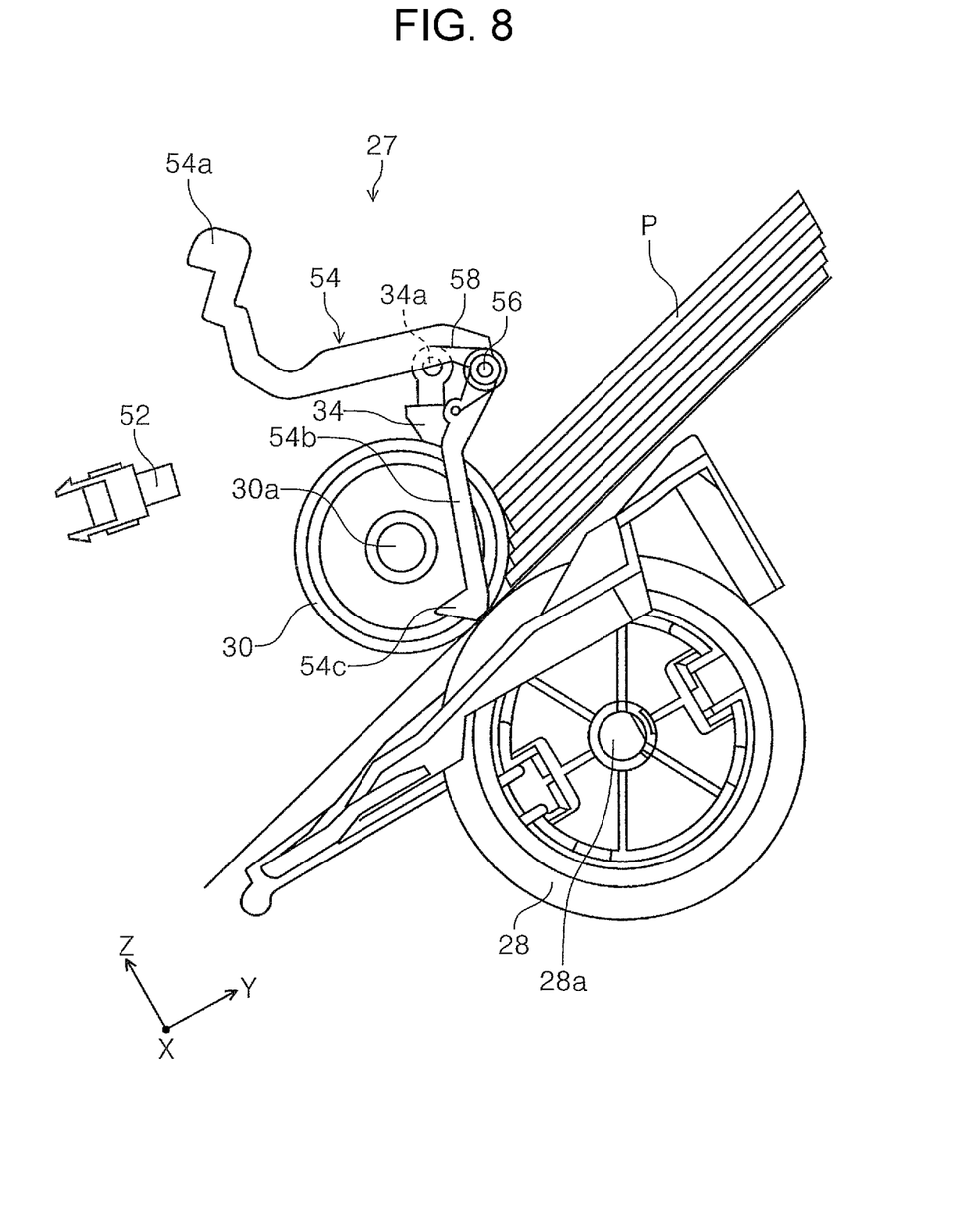
FIG. 8 is a side sectional view which illustrates a fourth posture of the detecting lever according to the invention.
Figure 9:
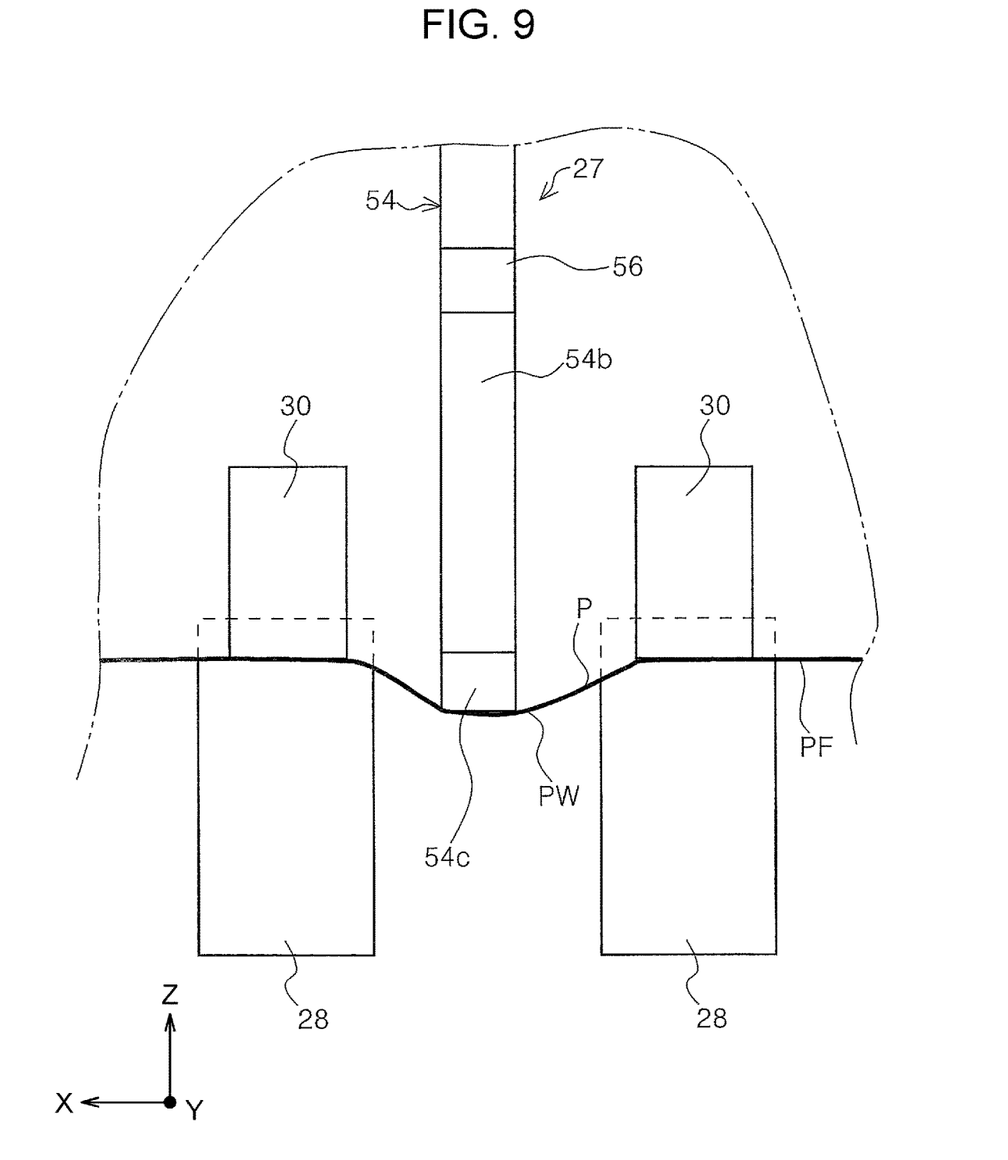
FIG. 9 is an explanatory diagram which illustrates a state in which a sheet is bent, using the detecting lever according to the invention.

In addition, FIG. 5 is a side sectional view which illustrates a non-detecting posture of the detecting lever according to the invention, FIG. 6 is a side sectional view which illustrates a detecting posture of the detecting lever according to the invention, FIG. 7 is a side sectional view which illustrates a medium transporting posture of the detecting lever according to the invention, FIG. 8 is a side sectional view which illustrates a fourth posture of the detecting lever according to the invention, and FIG. 9 is an explanatory diagram which illustrates a state in which a sheet is bent, using the detecting lever according to the invention.

In an X-Y-Z coordinate system in each figure, an X direction is an apparatus width direction, and a sheet width direction, a Y direction is a sheet transport direction in the image reading apparatus, and a Z direction is a direction orthogonal to the Y direction, and denotes a direction which is roughly orthogonal to a face of the sheet which is transported. In addition, a −Y direction side is set to an apparatus front face side, and a +Y direction is set to an apparatus rear face side, in each figure.

First Embodiment

Outline of Image Reading Apparatus

An image reading apparatus 10 will be described with reference to FIGS. 1 to 3. The image reading apparatus 10 in the embodiment is configured as a document scanner which can read at least one face of the front face and the rear face of a sheet P as a "medium". The image reading apparatus 10 is provided with a medium transport device 11, a lower unit 12, an upper unit 14, a cover portion 16, and a sheet discharging tray 18. In addition, a configuration of the medium transport device 11 will be described with reference to FIG. 3, along with a sheet transport path of the image reading apparatus 10.

The upper unit 14 is rotatably attached to the lower unit 12 by having the downstream side in the sheet transport direction as a rotating fulcrum. The upper unit 14 can obtain a closing state (refer to FIG. 2) in which a transport path of the sheet P is configured along with the lower unit 12 by being closed with respect to the lower unit 12, and an open state (refer to FIG. 4) in which it is possible to easily treat jamming (clogging) of the sheet P by exposing a transport path of the sheet P, by rotating with respect to the lower unit 12 on the apparatus front face side.

The cover portion 16 is provided above the rear face side of the lower unit 12. The cover portion 16 is rotatably attached to the lower unit 12. The cover portion 16 can obtain a non-feeding state of covering the upper part of the upper unit 14, and a feeding port 20 (refer to FIG. 2) as illustrated in FIG. 1, and a feeding state in which the cover portion rotates on the apparatus rear face side from the non-feeding state, the feeding port 20 is open, and a rear face 16a of the cover portion 16 configures a sheet support unit 22 as a "medium support portion" of the sheet P, as illustrated in FIG. 2.

When the cover portion 16 is changed from the non-feeding state to the feeding state, an operation unit 23 which is provided above the upper unit 14 is exposed. When a user operates the operation unit 23, feeding of the sheet P, and an image reading operation in the image reading apparatus 10 are performed. According to the embodiment, the operation unit 23 is provided with a power button which switches a power supply of the image reading apparatus 10 to an ON state or an OFF state, a feeding start button, or the like, which causes feeding of the sheet P mounted on the sheet support unit 22, and an image reading operation to be started, as an example.

A discharging port 24 which discharges the sheet P is provided on the apparatus front face side of the lower unit 12. In addition, the lower unit 12 is provided with a sheet discharging tray 18 which can be pulled out toward the apparatus front side from the discharging port 24. The sheet discharging tray 18 can obtain a state of being accommodated in a base portion of the lower unit 12 (refer to FIG. 1), and a state of being pulled out to the apparatus front face side (refer to FIG. 2). In addition, the sheet discharging tray 18 in the embodiment is configured by connecting a plurality of tray members, and a pulling-out length from the discharging port 24 can be adjusted according to a length of the sheet P which is discharged. Regarding feeding path in image reading apparatus Subsequently, the medium transport device 11 and a sheet transport path 26 in the image reading apparatus 10 will be described with reference to FIG. 3. In the embodiment, the medium transport device 11 is configured of the sheet support unit 22, a sheet detecting unit 27, a feeding roller 28, and a separating roller 30.

A plurality of the sheets P are mounted on the sheet support unit 22 which is provided on the rear face 16a of the cover portion 16 in a posture of rotating on the apparatus rear face side with respect to the lower unit 12. The plurality of sheets P which are mounted on the sheet support unit 22 are fed to the downstream side in a feeding direction using the feeding roller 28 as the "feeding roller" which is rotatably provided on the downstream side of the sheet support unit 22 in the feeding direction in the lower unit 12. In addition, in the lower unit 12 and the upper unit 14 in FIG. 3, only an outline of a housing thereof is denoted by an imaginary line, and illustrations of constituent elements of which descriptions are not necessary are omitted.

The sheet detecting unit 27 as a "detecting unit" for detecting the sheet P is provided between the sheet support unit 22 and the feeding roller 28 on the sheet transport path 26. The sheet detecting unit 27 will be described later.

The feeding roller 28 in the embodiment is rotatably driven around a rotating shaft 28a by a driving source (not illustrated). In addition, the outer peripheral face of the feeding roller 28 is formed of a high friction material (for example, elastomer, or the like, such as rubber).

The separating roller 30 as a "separating unit" is rotatably provided around the rotating shaft 30a, at a position which faces the feeding roller 28 in the upper unit 14. The separating roller 30 in the embodiment is urged toward the feeding roller 28 using an urging unit (not illustrated). In addition, the outer peripheral face of the separating roller 30 is formed of a high friction material (for example, elastomer, or the like, such as rubber), similarly to the outer peripheral face of the feeding roller 28.

In addition, in the embodiment, the separating roller 30 is provided with a torque limiter 32. In addition, the separating roller 30 is configured so as to receive a driving torque in a direction opposite (counterclockwise direction in FIG. 3) to a rotating direction (clockwise direction in FIG. 3) in which the sheet P is sent to the downstream side in the transport direction from a torque applying unit (not illustrated), or a driving source such as a driving motor, through the torque limiter 32. In addition, when a rotational torque which is receive from the feeding roller 28 exceeds a limit torque of the torque limiter 32 in a state in which the separating roller 30 is in contact with the feeding roller 28, the separating roller rotates by being driven by the feeding roller 28 (clockwise direction in FIG. 3).

As illustrated in FIG. 4, the feeding roller 28 is provided in a center region of the sheet P in the sheet width direction (X direction) in a direction intersecting the transport direction of the sheet P. In the embodiment, a feeding reference position in the sheet width direction is set to a center. In addition, a center portion in the sheet width direction of the sheet P which is sent along the sheet transport path 26 comes into contact with the feeding roller 28 and the separating roller 30, regardless of a size thereof. A plurality sets of the feeding rollers 28 and separating rollers 30 are provided in the sheet width direction, and two sets are provided in the embodiment, as illustrated in FIG. 4.

In the plurality of sheets P in FIG. 3, tip ends thereof are held at a feeding standby position (position in FIG. 3) using a flap 34, which will be described later, and entering thereof between the feeding roller 28 and the separating roller 30 is regulated.

Here, the flap 34, and a separating unit 36 will be described. The flap 34 in the embodiment is attached to the upper unit 14 so as to oscillate around an oscillating shaft 34a (refer to FIGS. 5 and 6). In addition, the flap 34 is urged using an urging unit (not illustrated) in a posture of blocking the sheet transport path 26 (refer to FIGS. 5 and 6). According to the embodiment, the flap 34 is configured so as to switch between a posture of blocking the sheet transport path 26 (refer to FIGS. 5 and 6) and a posture of opening the sheet transport path 26 (refer to FIG. 3).

The separating unit 36 is provided at the periphery of the feeding roller 28. In addition, the separating unit 36 can be switched between a supporting posture which supports the sheet P (refer to FIGS. 5 and 6) and a retreating posture which retreats from the sheet transport path 26 (refer to FIG. 3) using a driving unit (not illustrated). The separating unit 36 supports the plurality of sheets P which are set in the sheet support unit 22, and prevents the lowest sheet P from being contact with the feeding roller 28, in the supporting posture.

A recessed portion 36a (refer to FIGS. 4 and 5) as a locking portion is formed in the separating unit 36, and as illustrated in FIG. 5, a tip end 34b of the flap 34 enters a recessed portion 36a, and is locked, in the supporting state of the separating unit 36. In this state, oscillating of the flap 34 around the oscillating shaft 34a is regulated. That is, the flap 34 assumes a posture of blocking the sheet transport path 26.

In addition, in this posture, the sheet P is regulated so as not to rush into the separating roller 30 on the downstream side in the transport direction, since oscillating of the flap 34 is regulated by the separating unit 36. That is, the flap 34 functions as a stopper of the sheet P.

When feeding of the sheet P is started, the separating unit 36 retreats to the lower side, and the lowest sheet P in the plurality of sheets P is in contact with the feeding roller 28. In addition, the flap 34 enters a state in which oscillating is possible (state in which switching of posture is possible). In addition, the lowest sheet P is sent out to the downstream side in the transport direction due to a rotation of the feeding roller 28. The flap 34 oscillates toward the downstream side due to the sheet P which is sent out to the downstream side, and assumes a posture of opening the sheet transport path 26.

When feeding of the sheet P is started, and a plurality of sheets P enter a position between the feeding roller 28 and the separating roller 30, the separating roller 30 is unable to receive a rotational torque from the feeding roller 28, and a rotation thereof which is driven by the feeding roller 28 is stopped. Due to this, sheets P to be fed except for the lowermost sheet P (document for preventing double feeding) are unable to receive a transporting force for proceeding to the downstream side, and are unable to proceed to the downstream side, while being in a state in which tips end thereof are in contact with the separating roller 30. In this manner, it is possible to prevent double feeding of the sheet P. In addition, since the lowermost sheet P to be fed is in direct contact with the feeding roller 28, the lowermost sheet P is sent to the downstream side due to the transporting force which is received from the feeding roller 28.

A pair of transport rollers 38, an image reading unit 40 as an "image reading unit", and a pair of discharging rollers 42 are provided on the downstream side of the feeding roller 28 and the separating roller 30 in the feeding direction. The sheet P which is fed on the downstream side in the feeding direction by being held between the feeding roller 28 and the separating roller 30 is transported to the image reading unit 40 which is located on the downstream side of the pair of transport rollers 38, by being held between the pair of transport rollers 38.

In addition, the pair of transport rollers 38 includes a transport driving roller 38a which is provided in the lower unit 12, and a transport driven roller 38b which is provided in the upper unit 14, and rotates in a driven manner with respect to the transport driving roller 38a.

In the embodiment, a double feeding detecting sensor 44 is provided between the feeding roller 28 and the pair of transport rollers 38, on the sheet transport path 26. The double feeding detecting sensor 44 in the embodiment is configured as an ultrasonic sensor which includes a speaker and a microphone. In addition, the double feeding detecting sensor 44 is configured so that an ultrasonic wave is generated from the speaker toward the sheet P which passes through the sheet transport path 26, and a reflected sound from the sheet P is detected in the microphone.

The double feeding detecting sensor 44 in the embodiment is configured so as to also detect a paper type of thick paper, or the like, not only detecting double feeding of the sheet P using a frequency of the reflected sound. In addition, the double feeding detecting sensor 44 in the embodiment is configured so as to detect passing through of a tip end and a rear end of the sheet P based on a presence or absence of reflected sound from the sheet P. The double feeding detecting sensor 44 transmits a detected signal of the sheet to the control unit 50 which will be described later.

The image reading unit 40 is provided with an upper part image reading sensor 46 which is provided on the upper unit 14 side, and a lower part image reading sensor 48 which is provided on the lower unit 12 side. In the embodiment, the upper part image reading sensor 46 and the lower part image reading sensor 48 are configured as a contact-type image sensor module (CISM), as an example.

The sheet P is discharged from the discharging port 24 toward a sheet discharging tray 18 by being held between the pair of discharging rollers 42 which is located on the downstream side of the image reading unit 40 in the transport direction, after an image on at least one face of the front face and the rear face of the sheet P is read in the image reading unit 40. In addition, a dashed line in FIG. 3 denotes a transport locus of the sheet P.

The pair of discharging rollers 42 includes a discharging driving roller 42a which is provided in the lower unit 12, and a discharging driven roller 42b which is provided in the upper unit 14, and rotates in a driven manner with respect to the discharging driving roller 42a.

In the embodiment, the feeding roller 28, the transport driving roller 38a, and the discharging driving roller 42a are driven in a rotating manner, by at least one driving source (not illustrated) which is provided inside the lower unit 12.

In addition, in the embodiment, the control unit 50 (refer to two-dot dashed line in FIG. 3) is provided inside the lower unit 12. The control unit 50 in the embodiment is configured as an electric circuit which includes a plurality of electronic components. The control unit 50 controls the upper part image reading sensor 46, the lower part image reading sensor 48, and the driving source. In addition, the control unit 50 controls a transporting operation of the sheet P on the sheet transport path 26, based on detection information of the sheet P in the sheet detecting unit 27, and the double feeding detecting sensor 44.

In addition, the control unit 50 is configured so as to control transporting of the sheet P, and an image reading operation in the image reading apparatus 10. The control unit 50 may control operations which are necessary for performing a document reading operation in the image reading apparatus 10 based on an instruction from the outside (PC, or the like)

Regarding Detecting Unit

The sheet detecting unit 27 will be described with reference to FIGS. 4 to 8. In the embodiment, the sheet detecting unit 27 is provided in the upper unit 14. The sheet detecting unit 27 in the embodiment is provided with a detecting unit 52, and a lever member 54.

In the embodiment, the lever member 54 is attached to the upper unit 14 so as to oscillate around an oscillating shaft 56. In the embodiment, an urging unit 58 is provided at the periphery of the oscillating shaft 56. One end of the urging unit 58 is attached to the lever member 54, and the other end is attached to the upper unit 14. In the embodiment, the urging unit 58 is configured as a torsion spring, and urges the lever member 54 in counterclockwise in FIGS. 5 to 8. In addition, the oscillating shaft 56 in the embodiment is located on the upper part in the Z axis direction, compared to a position in which the sheet P and the lever member 54 are in contact.

The lever member 54 is provided with a portion to be detected 54a, an abutting portion 54b, and a pressing portion 54c. Specifically, in the lever member 54, the portion to be detected 54a is provided on one side, and the abutting portion 54b is provided on the other side by interposing the oscillating shaft 56 therebetween. The abutting portion 54b extends across the sheet transport path 26 from the oscillating shaft 56. In addition, the pressing portion 54c is provided on a tip end side of the abutting portion 54b. The lever member 54 is disposed between the two separating rollers 30 in the sheet width direction as illustrated in FIG. 4.

The lever member 54 in the embodiment can perform switching of the first posture illustrated in FIG. 5, the second posture illustrated in FIG. 6, the third posture illustrated in FIG. 7, and the fourth posture illustrated in FIG. 8, by oscillating around the oscillating shaft 56.

The lever member 54 in FIG. 5 assumes the first posture. In the embodiment, the first posture of the lever member 54 is a state in which the sheet P is not set in the sheet support unit 22. Accordingly, the lever member 54 is urged by the urging unit 58, and it enters a state in which the abutting portion 54b and the pressing portion 54c are located on the upstream side in the transport direction. In addition, in the posture, the portion to be detected 54a of the lever member 54 enters a state of being received in the detecting unit 52. Here, a configuration of the detecting unit 52 will be described. The detecting unit 52 according to the embodiment is configured as an optical sensor which includes an irradiation unit and a light receiving unit, as an example. The irradiation unit and the light receiving unit face each other, and are provided with in interval.

The irradiation unit in the embodiment is formed as a liquid emitting unit which emits light using a light source such as a light emitting element, and the light receiving unit is formed by including a light receiving element which can convert received light of, for example, a phototransistor, a photo diode, or the like, into an electric signal corresponding to light intensity thereof. According to the embodiment, in the detecting unit 52, it is configured so that, when light is radiated from the irradiation unit, light is received in the light receiving unit which is located in a radiating direction of light.

When the lever member 54 assumes the first posture in the embodiment, the portion to be detected 54a enters a position between the irradiation unit and the light receiving unit of the detecting unit 52, and blocks light which is radiated from the irradiation unit toward the light receiving unit. According to the embodiment, a state in which light from the irradiation unit is not detected in the light receiving unit is set to a non-detecting state of the sheet P in the detecting unit 52.

Subsequently, when the sheet P is set in the sheet support unit 22, a tip end of the sheet P is in contact with the abutting portion 54b of the lever member 54 which assumes the first posture, when referring to FIG. 6. Here, as illustrated in FIG. 3, a weight of the sheet P works in the abutting portion 54b, and the abutting portion 54b is pressed due to the weight of the sheet P, since the sheet support unit 22 supports the sheet P in an inclined state. As a result, the lever member 54 oscillates in clockwise in FIGS. 5 and 6 around the oscillating shaft 56 against an urging force of the urging unit 58 due to the weight of the sheet P. In addition, a posture of the lever member 54 is switched from the first posture to the second posture.

In the second posture of the lever member 54, tip ends of the plurality of sheets P which are supported by the sheet support unit 22 are in contact with a face of the abutting portion 54b on the upstream side in the transport direction. In addition, in this state, the pressing portion 54c which is provided on the tip end side of the abutting portion 54b is located on the outer side of the sheet transport path 26.

In addition, the portion to be detected 54a oscillates in the clockwise direction in FIGS. 5 and 6 along with switching from the first posture to the second posture of the lever member 54, and gets out from between the irradiation unit and the light receiving unit of the detecting unit 52. In this manner, light from the irradiation unit is detected in the light receiving unit in the detecting unit 52, and it enters a detected state. That is, it enters a state in which the sheet P is detected in the detecting unit 52. In addition, the detecting unit 52 transmits a detected signal of the sheet P to the control unit 50. Accordingly, when the abutting portion 54b of the lever member 54 reaches a predetermined position in the sheet transport path 26, the sheet P is detected.

Subsequently, when referring to FIG. 7, the control unit 50 causes the feeding roller 28 to be rotatably driven based on an input from the operation unit 23, or an instruction from the outside (PC, or the like, which is connected to image reading apparatus 10). In addition, the separating unit 36 is switched from a supporting posture to a retreating posture according to the operation using a driving unit (not illustrated). In this manner, a state in which a tip end 34b enters the recessed portion 36a, in the flap 34, that is, a locked state is released, and oscillating is performed toward the clockwise direction in FIG. 7, that is, toward the downstream side in the transport direction, around the oscillating shaft 34a.

In addition, the lowermost sheet P in the plurality of sheets P which are set in the sheet support unit 22 is in contact with the feeding roller 28 which is rotatably driven according to switching in a posture of the separating unit 36. In addition, the lowermost sheet P is sent to the downstream side in the transport direction, by receiving a transporting force from the feeding roller 28.

In this manner, the abutting portion 54b of the lever member 54 is pressed by the sheet P which is fed, using the feeding roller 28, and is switched to the third posture by further oscillating in the clockwise direction in FIG. 7 from the second posture against an urging force of the urging unit 58. As a result, the pressing portion 54c is located on the downstream side in the transport direction, compared to a position at which the separating roller 30 and the sheet P are in contact, in the inside of the sheet transport path 26.

Here, descriptions will be made with reference to FIG. 9. In addition, FIG. 9 is a schematic view in which the feeding roller 28 and the separating roller 30 are viewed from the downstream side of the feeding roller 28 and the separating roller 30 in the transport direction, in the sheet transport path 26. In the third posture (refer to FIG. 7) of the lever member 54, since the pressing portion 54c of the lever member 54 proceeds to the inside of the sheet transport path 26, the pressing portion is in contact with the sheet P which is sent by the feeding roller 28. In addition, a center region of the sheet P in the sheet width direction is pressed by being in contact with the pressing portion 54c. As a result, the center region of the sheet P in the sheet width direction is bent to the lower side. In this manner, since a bent portion PW is formed when the center region is bent from a front end PF toward a rear end of the sheet P, along with transporting of the sheet P, it is possible to increase rigidity of the sheet P when transporting the sheet P.

In the embodiment, since the lever member 54 oscillates against an urging force of the urging unit 58, and is switched in order of the first posture, the second posture, and the third posture, the urging force of the urging unit 58 which works in the pressing portion 54c of the lever member 54 is increased along with switching to the first posture, the second posture, and the third posture in order. As a result, since an urging force which acts on the pressing portion 54c in the third posture is larger than an urging force which acts on the pressing portion 54c in the second posture, it is possible to further reliably bent the sheet P, by increasing a pressing force which presses the sheet P.

In addition, the flap 34 is pressed by the sheet P which is sent to the downstream side in the transport direction, oscillates in the clockwise direction in FIGS. 6 and 7, and is changed from a posture of blocking the sheet transport path 26 to a posture of opening the sheet transport path 26.

The fourth posture of the lever member 54 will be described with reference to FIG. 8. There is a case in which a sheet P with high rigidity, or a sheet P formed of a material which is not easily deformed is transported on the sheet transport path 26. In this case, the pressing portion 54c of the lever member 54 is in contact with a tip end PF of the sheet P with high rigidity, and is pressed by the sheet P, using the sheet P, when the sheet P with high rigidity is fed, using the feeding roller 28, for example. As a result, the lever member 54 further oscillates in the clockwise direction in FIG. 8 against the urging force of the urging unit 58, and retreats from the sheet transport path 26. In this manner, the lever member 54 assumes a posture which retreats from the sheet transport path 26, that is, the fourth posture.

In addition, the lever member 54 oscillates toward the first posture from the state of assuming the third posture or the fourth posture, using the urging force of the urging unit 58, when feeding of the sheet P using the feeding roller 28 is finished.

Modification Example of Embodiment (1) In the first embodiment, the configuration in which the sheet detecting unit 27 is provided on the upper unit 14 side is adopted; however, it may be a configuration in which the sheet detecting unit is provided on the lower unit 12 side, instead of the configuration. (2) In the embodiment, the configuration in which one lever member 54 is provide is adopted; however, it may be a configuration in which a plurality of the lever members 54 are provided, or a configuration in which the lever member is provided by having an appropriate interval, not only in the center region in the sheet width direction. (3) In the embodiment, the configuration in which the sheet P is bent to the lower side in the Z axis direction; however, it may be a configuration in which the sheet P is bent to the upper side in the Z axis direction, instead of the configuration. (4) In the embodiment, the configuration in which the pressing portion 54c which bends the sheet P is provided in the sheet detecting unit 27; however, it may be a configuration in which a pressing portion is provided in a blocking member, or the like, which blocks the sheet transport path 26, for example, instead of the configuration.

When summarizing the above descriptions, the medium transport device 11 is provided with the feeding roller 28 which sends the sheet P to the downstream side, and the sheet detecting unit 27 which can detect the sheet P sent by the feeding roller 28 at a predetermined position on the sheet transport path 26. The sheet detecting unit 27 is provided with the lever member 54 which changes a posture by being in contact with the sheet P, and the detecting unit 52 which detects the change in posture of the lever member 54. The lever member 54 applies an external force which causes at least a part of the sheet P to be bent in a direction intersecting the transport direction of the sheet P, by being in contact with the sheet P in a predetermined posture.

According to the above described configuration, since the lever member 54 applies the external force which causes at least a part of the sheet P to be bent in the sheet width direction (causes to be bent toward feeding roller 28 side in the embodiment), as the direction intersecting transport direction of sheet P, by being in contact with the sheet P, it is possible to make rigidity of the sheet P when being transported strong, by causing at least a part of the sheet P to be bent, and to reduce jamming (clogging) of the sheet on the sheet transport path 26. In addition, since the lever member 54 which detects passing through of the sheet P has a function of improving rigidity by causing the sheet to be bent, it is possible to reduce the number of components, and make a configuration of the apparatus simple.

In the medium transport device 11, the posture of the lever member 54 includes the first posture which is not in contact with the sheet P, the second posture which detects the sheet P by being in contact with the sheet P, and the third posture which applies an external force which causes a part of the sheet P to be bent in the sheet width direction to the sheet P. The medium transport device 11 includes the urging unit 58 which urges the lever member 54 toward the first posture. The urging force with which the urging unit 58 urges the lever member 54, when the lever member 54 assumes the third posture is larger than the urging force with which the urging unit 58 urges the lever member 54, when the lever member 54 assumes the second posture.

According to the above described configuration, since the urging force of the urging unit 58 in the third posture of the lever member 54 is larger than the urging force in the second posture, in a case in which the sheet P is detected in the lever member 54, it is possible to reduce a load applied to the sheet P, and increase a load applied to the sheet P when an external force is applied so as to bend the sheet P. As a result, it is possible to make rigidity of the sheet P, and further reliably reduce jamming of the sheet P, since the sheet P is further reliably bent when being transported.

In the medium transport device 11, the lever member 54 can assume the fourth posture which is a posture in which the lever member retreats from the sheet transport path 26, compared to the third posture according to rigidity of the sheet P.

According to the configuration, it is possible to relieve a concern that a sheet P may be scratched when transporting a sheet P which is rarely bent even when the lever member 54 applies an external force, for example, a sheet P with high rigidity.

The medium transport device 11 is provided with the separating roller 30 which separates the sheet P by holding thereof between the separating unit and the feeding roller 28, and a sheet support unit 22 which is provided on the upstream side of the feeding roller 28 and the separating roller 30, and supports the sheet P. The lever member 54 assumes the first posture in a state in which the sheet P is not supported by the sheet support unit 22, is switched to the second posture from the first posture due to a tip end of the sheet P, when the sheet P is set on the sheet support unit 22, and is switched to the third posture from the second posture due to the sheet P, when the sheet P is sent out from the sheet support unit 22 due to a rotation of the feeding roller 28.

In the medium transport device 11, the lever member 54 changes a posture when oscillating around the oscillating shaft 56, and the oscillating shaft 56 is located above a position at which the sheet P is in contact with the lever member 54.

According to the configuration, it is possible to cause the lever member to smoothly oscillate with a small resistance, when the sheet P causes the lever member 54 to oscillate.

In the medium transport device 11, the lever member 54 includes the abutting portion 54b which extends across the sheet transport path 26 from the oscillating shaft 56, and is in contact with the tip end PF of the sheet P which is set on the sheet support unit 22, and the pressing portion 54c which is provided on the tip end side of the lever member 54 compared to the abutting portion 54b, and presses the sheet P when the lever member 54 assumes the third posture.

In the medium transport device 11, the abutting portion 54b is located on the upstream side of the separating roller 30 in the transport direction, on the sheet transport path 26, when the lever member 54 assumes the first posture and the second posture, and is located on the downstream side compared to a position at which the separating roller 30 and the sheet P are in contact, on the sheet transport path 26 when the lever member 54 assumes the third posture.

According to the configuration, since the abutting portion 54b is located on the downstream side compared to the position at which the separating roller 30 and the sheet P are in contact, on the sheet transport path 26, when the lever member 54 assumes the third posture, the abutting portion 54b does not hinder separating of the sheet P using the separating roller 30 when transporting the sheet P, and it is possible to reliably separate the sheet P.

The image reading apparatus 10 is provided with the above described medium transport device 11, and the image reading unit 40 which can read the sheet P transported by the feeding roller 28.

The invention is not limited to the above described embodiments, can be variously modified in the scope of the invention which is described in claims, and it is needless to say that those modifications are also included in the scope of the invention.

The entire disclosure of Japanese Patent Application No. 2015-215751, filed Nov. 2, 2015 is expressly incorporated by reference herein.

What is claimed is:

1. A medium transport device comprising:
   a feeding roller which sends a medium to a downstream side; and
   a detecting unit which detects the medium sent by the feeding roller at a predetermined position on a transport path,
   wherein the detecting unit includes a lever member of which a posture is changed when being in contact with the medium, and a detecting portion which detects a change in posture of the lever member,
   wherein the lever member applies an external force which causes at least a part of the medium to be bent in a gravity direction by being in contact with the medium in a predetermined posture, and
   wherein the lever member and the feeding roller are positioned in relation to each other to cause the medium to be bent in a length-wise direction as opposed to a width-wise direction.

2. The medium transport device according to claim 1, wherein, in postures of the lever member, a first posture of not being in contact with the medium, a second posture of detecting the medium by being in contact with the medium, and a third posture of applying an external force which causes at least a part of the medium to be bent in the gravity direction are included, wherein the lever member includes an urging unit which urges the lever member toward the first posture, and wherein an urging force with which the urging unit urges the lever member, when the lever member assumes the third posture, is larger than an urging force with which the urging unit urges the lever member when the lever member assumes the second posture.

3. The medium transport device according to claim 2, wherein the lever member is configured to assume a fourth posture as a posture in which the lever member retreats from the medium transport path, compared to the third posture according to rigidity of the medium.

4. An image reading apparatus comprising:
   the medium transport device according to claim 3; and
   an image reading unit which reads the medium transported by the feeding roller.

5. The medium transport device according to claim 2, further comprising:
   a separating unit which separates the medium by holding thereof between the separating unit and the feeding roller; and
   a medium support unit which is provided on an upstream side of the feeding roller and the separating unit, and supports the medium,
   wherein the lever member assumes the first posture in a state in which the medium is not supported by the medium support unit, is switched from the first posture to the second posture due to a tip end of the medium, when the medium is set on the medium support unit, and is switched from the second posture to the third posture due to the medium, when the medium is sent out from the medium support unit due to a rotation of the feeding roller.

6. An image reading apparatus comprising:
   the medium transport device according to claim 5; and
   an image reading unit which reads the medium transported by the feeding roller.

7. The medium transport device according to claim 2, wherein the lever member changes a posture when oscillating around an oscillating shaft, and the oscillating shaft is located above a position at which the medium is in contact with the lever member.

8. An image reading apparatus comprising:
   the medium transport device according to claim 7; and
   an image reading unit which reads the medium transported by the feeding roller.

9. The medium transport device according to claim 2, wherein the lever member includes an abutting portion which extends across the medium transport path from an oscillating shaft, and is in contact with a tip end of the medium which is set on a medium support unit, and a pressing portion which is provided on a tip end side of the lever member, compared to the abutting portion, and presses the medium when the lever member assumes the third posture.

10. The medium transport device according to claim 9, wherein the abutting portion is located on an upstream side of a separating unit in a transport direction on the medium transport path, when the lever member assumes the first posture and the second posture, and is located on a downstream side of a position at which the separating unit and the medium are in contact, on the medium transport path, when the lever member assumes the third posture.

11. An image reading apparatus comprising:
    the medium transport device according to claim 10; and
    an image reading unit which reads the medium transported by the feeding roller.

12. An image reading apparatus comprising:
    the medium transport device according to claim 9; and
    an image reading unit which reads the medium transported by the feeding roller.

13. An image reading apparatus comprising:
    the medium transport device according to claim 2; and
    an image reading unit which reads the medium transported by the feeding roller.

14. An image reading apparatus comprising:
    the medium transport device according to claim 1; and
    an image reading unit which reads the medium transported by the feeding roller.

* * * * *